March 15, 1932.  R. I. NEWTON  1,849,377

SHORE

Filed March 17, 1930

Inventor
Robert I. Newton.
By Thorpe&Thorpe
Attorneys

Patented Mar. 15, 1932

1,849,377

UNITED STATES PATENT OFFICE

ROBERT I. NEWTON, OF KANSAS CITY, MISSOURI, ASSIGNOR, BY DIRECT AND MESNE ASSIGNMENTS, TO SOUTHWESTERN SHORE COMPANY, A CORPORATION OF MISSOURI

SHORE

Application filed March 17, 1930. Serial No. 436,523.

This invention relates to shores and more especially to shores of the extensible type and consisting of slidable lower and upper members and means whereby the weight of the upper member and the load thereon serve as the medium whereby said member is held at the desired point of adjustment relative to the other or lower member, and my objects are to produce a shore belonging to the general class mentioned which is of very simple construction and easily operated, consists of but few parts, and which furthermore, while very efficient in its gripping action can be instantly ungripped.

With these objects in view, the invention consists in certain novel and useful features of construction and combinations of parts as hereinafter described and claimed; and in order that it may be fully understood, reference is to be had to the accompanying drawings, in which:

Figure 1:
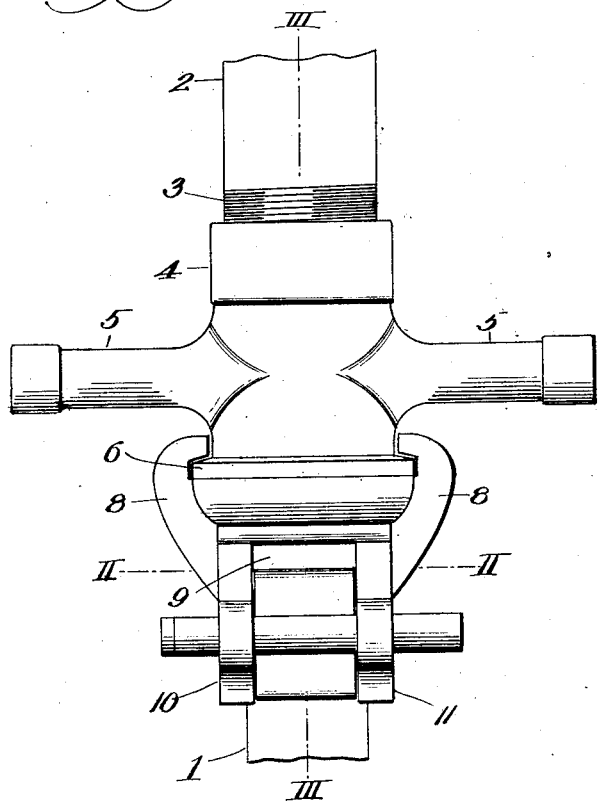
Figure 1 is a fragmentary elevational view of a shore embodying the invention.

Referring to the drawings in detail, 1 indicates the lower or inner member adapted to stand upon the ground or other support, and usually provided with an enlarged foot or base, not shown. In this instance the member 1 is shown as of tubular cylindrical form, and fitting slidingly upon it is an upper tubular member 2 so that relative telescopic action may occur for purposes of shortening or lengthening the shore.

The lower end of the member 2 is threaded as at 3 and engaged with a cylindrical nut 4, and said nut is provided with handles 5 so that when properly supported, it may be readily turned by hand to effect upward movement of the member 2 until pressed tightly against the under side of a beam or the like, not shown, for carrying a load.

Figure 2:
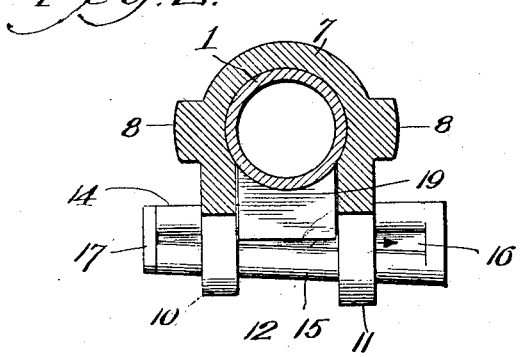
Figure 2 is a horizontal section on the line II—II of Figure 1.
Figure 4:
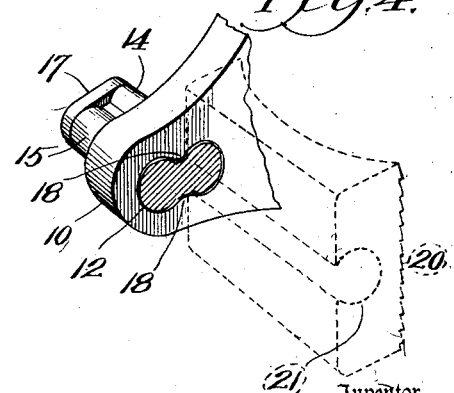
Figure 4 is a fragmentary perspective view of parts of the appliance.

The nut 4 is provided at its lower end with a circumferential flange 6, and rests upon a collar 7 fitting snugly around or upon member 1, and said collar is provided with a pair of diametrically-opposite hooks 8 which fit over the flange 6 of the nut. The collar is provided with a bifurcation 9, which in width is somewhat less than the diameter of the member 1, and is provided at the side margins of the said bifurcations with a pair of laterally-projecting and preferably parallel lugs 10 and 11, lug 11 being shown as slightly longer than lug 10, and said lugs are provided with slots or elongated openings 12 and 13 respectively, the latter slot or opening being the longer, and engaging said slots or openings is a wedge-shaped clamping key, consisting of two cylindrical portions 14 and 15, and the small end of the key has an end piece 17 forming shoulders for the adjacent end of the web. The slots 12 and 13 cross-sectionally conform to the key, that is to say, are reduced in width centrally so as to form ribs 18 spaced apart a lesser distance than the width of the end piece 17, so that the key when driven back, that is in the direction indicated by the arrow in Figure 2, will be arrested by the engagement of the end piece 17, with the said ribs. This retains the key against accidental dislocation from the slots which might otherwise occur in the event a heavy blow is necessary on the small end of the key to drive it back when it is desired to withdraw the shore from under a heavy load.

Fitting in the bifurcation between the lugs 11 and 12 is a segmental jaw 19, the same being of hard steel and provided at its inner side with teeth 20 to bite upon the lower member 1, and said jaw is provided with a slot 21 which is fitted with reasonable snugness upon inner portion 14 of the key. To so assemble the wedge and jaw it is necessary to slip the wedge endwise into the jaw before the end piece 7 is applied to the wedge, as it is desirable that the latter when driven back shall effect withdrawal movement of the jaw from member 1. For this reason the outer or open side of the slot 21 is narrower than the diameter of the inner member of the key, as clearly shown by Figure 3. Of course, shoulders can be formed on the small end of the key by upsetting such end, in lieu of the end piece 17, and in the manufacture in quantity, this method of providing against dislocation of the key is contemplated as less expensive. After the key is once in place there will be no necessity for removing it. It is subjected to no strain likely to fracture it.

Figure 3:
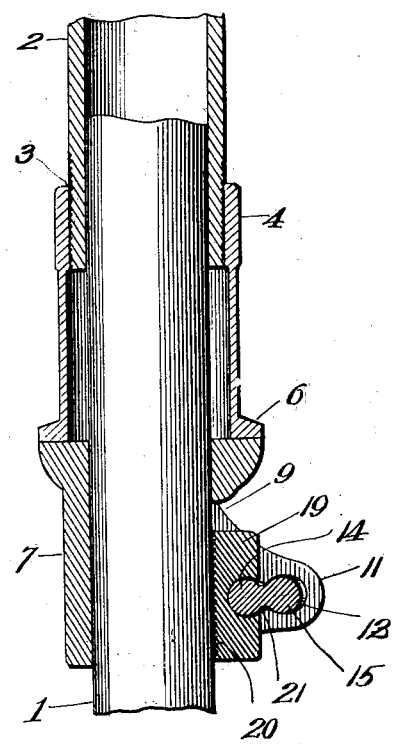
Figure 3 is a vertical section on the line III—III of Figure 1, but with the lower or inner member indicated in elevation.

Assuming that the shore is in shortened condition and is placed under a beam or the like to afford support for a load on such beam, the operator grasps handles 5 and pushes upwardly thereon, this action sliding the upper member and the collar 7 and jaw 19 in the same direction, and it will be noted by reference particularly to Figure 3, that in the initial part of this movement the upward pressure of the lugs 10 and 11 on the outer portion 15 of the key, tends to rock said portion of the key slightly upward with the inner portion as the center of such movement, this being true because there is some play of the key in the slots 12 and 13. In consequence of this movement any pressure of the jaw 19 on the lower member 1 is relaxed and consequently the jaw offers no material resistance to the upward sliding movement. When the upper end of the member 2 is arrested by contact with the overlying beam, the upward thrust on the handles is relaxed, and the tendency of the upper member to slide downward at this time, reverses its pressure on the key and thus tends to rock the outer portion 15 of the key downwardly and thereby tends to bring the axes of the portions 14 and 15 in the same horizontal plane. The result of this action is to thrust the jaw forcibly against the member 1 and arrest the downward movement of member 2. The operator may then grip the handles of and rotate the nut which, through its threaded engagement with member 2, forces the latter tightly against the overlying beam, the pressure of the jaw on member 1 in this action being intensified and thereby guarding against downward movement of the sleeve and the parts supported thereby. When the parts have been thus arranged, the operator drives or advances the wedge-shaped key by means of a hammer or otherwise and thus forces the jaw further inward against member 1 so that the teeth of the former shall slightly indent the latter. The load imposed upon the beam is transferred to member 2, and consequently the toggle relationship between the key and the jaw increases the pressure of the latter against member 1, it being understood in this connection that the parts will be so proportioned that it is never possible for the inner portion 14 of the key to pass beyond the level of the portion 15, and as a result any increase of the load cannot effect relaxation of the grip of the jaw on member 1.

It will furthermore be observed that when the shore is to be removed from its supporting position, it is only necessary to drive the wedge backward by means of a hammer or otherwise, and this action through the outward pressure of the portion 14 of the key on the jaw, effects outward movement of the latter and thus permits the upper member 2 together with the nut sleeve and jaw to slide downward upon member 1.

From the above description it will be apparent that I have produced a shore embodying the features of advantage set forth as desirable in the statement of the objects of the invention, and while I have illustrated and described the preferred embodiment of the invention, it will be apparent that it is susceptible of modification in minor particulars without departing from the principle of construction and mode of operation involved or from the spirit and scope of the appended claims.

I claim:

1. A shore comprising two members fitted slidably together, a collar fitting slidingly on one member and underlying the other to sustain the latter and provided with laterally-projecting slotted lugs, a jaw fitting between said lugs and against the member within the collar, and a tapered key extending through the slots of said lugs and interlocked with and forming a support for said jaw to effect pressure of the latter against the engaged member and prevent sliding movement of the other member tending to shorten the shore.

2. A shore comprising two members fitted slidably together, a collar fitting slidingly on one member and underlying the other to sustain the latter and provided with laterally-projecting slotted lugs, a jaw fitting between said lugs and against the member within the collar, and a tapered key extending through the slots of said lugs and interlocked with and forming a support for said jaw to effect pressure of the latter against the engaged member and prevent sliding movement of the other member tending to shorten the shore, and provided at its narrow end with a shoulder to abut the collar and hence avoid chance of dislocation from the lugs.

3. A shore comprising two members fitted slidably together, a collar fitting slidingly on one member and underlying the other to sustain the latter, and provided with laterally-projecting slotted lugs, a jaw fitting between said lugs and against the member within the collar and provided with a transverse slot having a constricted mouth, and a tapered key fitted slidably in the slots of the lugs and in the slot of the jaw and adapted when moved endwise in one direction to effect clamping pressure of the jaw on the member within the collar and when moved in the other direction to withdraw the jaw from the said member.

4. A shore comprising two members fitted slidably together, a collar fitting slidingly on one member and underlying the other to sustain the latter, and provided with laterally-projectng lugs provided with slots, one of which is of constricted width intermediate its length, a key comprising two cylindrical converging portions and a connecting web portion of less thickness than the converging portions, said key extending through said slots and capable of longitudinally slidable and a slight rocking movement therein, a jaw fitting between said lugs and against the member within said collar and provided with a transverse slot receiving the adjacent cylindrical portion of the key through relative lateral movement of either, the jaw and key constituting a toggle tending to straighten under the weight of the member overlying the collar and thereby effect clamping of the jaw against the other member, the advance of the key serving to intensify the pressure of the jaw against the engaged member and reverse movement of the key, to relax or remove such pressure.

In testimony whereof I affix my signature.

ROBERT I. NEWTON.